US006865554B1

(12) United States Patent
Wijn et al.

(10) Patent No.: US 6,865,554 B1
(45) Date of Patent: Mar. 8, 2005

(54) DEVICE AND METHOD FOR PRODUCING AN OPTICAL REGISTRATION CARRIER BY MEANS OF A MASTER MOLD, AN OPTICAL REGISTRATION CARRIER

(75) Inventors: Josephus Marinus Wijn, Eindhoven (NL); Arnoldus J. M. Van Der Stappen, Best (NL)

(73) Assignee: Singulus Mastering B.V., Eindhoven (NL)

( * ) Notice: Subject to any disclaimer, the term of this patent is extended or adjusted under 35 U.S.C. 154(b) by 0 days.

(21) Appl. No.: 09/509,387

(22) PCT Filed: Sep. 25, 1998

(86) PCT No.: PCT/NL98/00556

§ 371 (c)(1),
(2), (4) Date: Jun. 12, 2000

(87) PCT Pub. No.: WO99/17288

PCT Pub. Date: Apr. 4, 1999

(30) Foreign Application Priority Data

Sep. 26, 1997 (NL) .............................................. 1007123

(51) Int. Cl.[7] ................................................. H04L 9/00
(52) U.S. Cl. ......................................................... 705/58
(58) Field of Search ........................ 705/58, 57; 308/4; 380/44, 46

(56) References Cited

U.S. PATENT DOCUMENTS 5,572,589 A   11/1996  Waters et al.
5,761,301 A * 6/1998  Oshima et al. .............. 235/494
5,917,910 A * 6/1999  Ishiguro et al. ............. 380/201
6,052,465 A * 4/2000  Gotoh et al. ........... 369/124.07

FOREIGN PATENT DOCUMENTS

| EP | 0 129 427 A | 12/1984 | |
|----|-------------|---------|---|
| EP | 0 644 474 A1 | 3/1995 | |
| JP | 56165954 A * | 5/1980 | ........ 369/FOR 128 |
| NL | 8 703 032 A | 7/1989 | |

OTHER PUBLICATIONS

Edgar, Bob, Computer Language, v8, n6, p65 (5), Jun. 1991.*
Newton's Telecom Dictionary, ISBN No. 1–57820023–7, Oct., 1998, Fourtenth Edition.*

* cited by examiner

Primary Examiner—James P. Trammell
Assistant Examiner—Daniel L Greene
(74) Attorney, Agent, or Firm—Pillsbury Winthop LLP

(57) ABSTRACT

A method for producing, by means of a master mould, an optical registration carrier which is provided with at least one programme which comprises information stored in the form of variations in a physical parameter. A master mould is made by means of an encoder and a laser beam recorder, wherein the laser beam recorder is driven from the encoder for storing at least said programme on the master mould. Random verification positions are generated thereby, after which coordinates of the verification positions are encrypted into verification information. The verification information is stored in the programme and verification effects are stored at said verification positions.

27 Claims, 5 Drawing Sheets

CD sector = 2352 bytes

| Sync | Header | Sync | Header+1 | Sync | Header+2 |
|---|---|---|---|---|---|
| ID1 identifier | | Repeat | | Repeat | |
| Encoder ID LBR ID | | | | | |
| Time+Date Rec ID1 | | | | | |
| Format specific CD; tbs | | | | | |
| Phase effects list | | | | | |
| CRC over sector | | | | | |

Main channel data stream
CD-ROM empty sectors
CD-A digital silence

FIG. 3

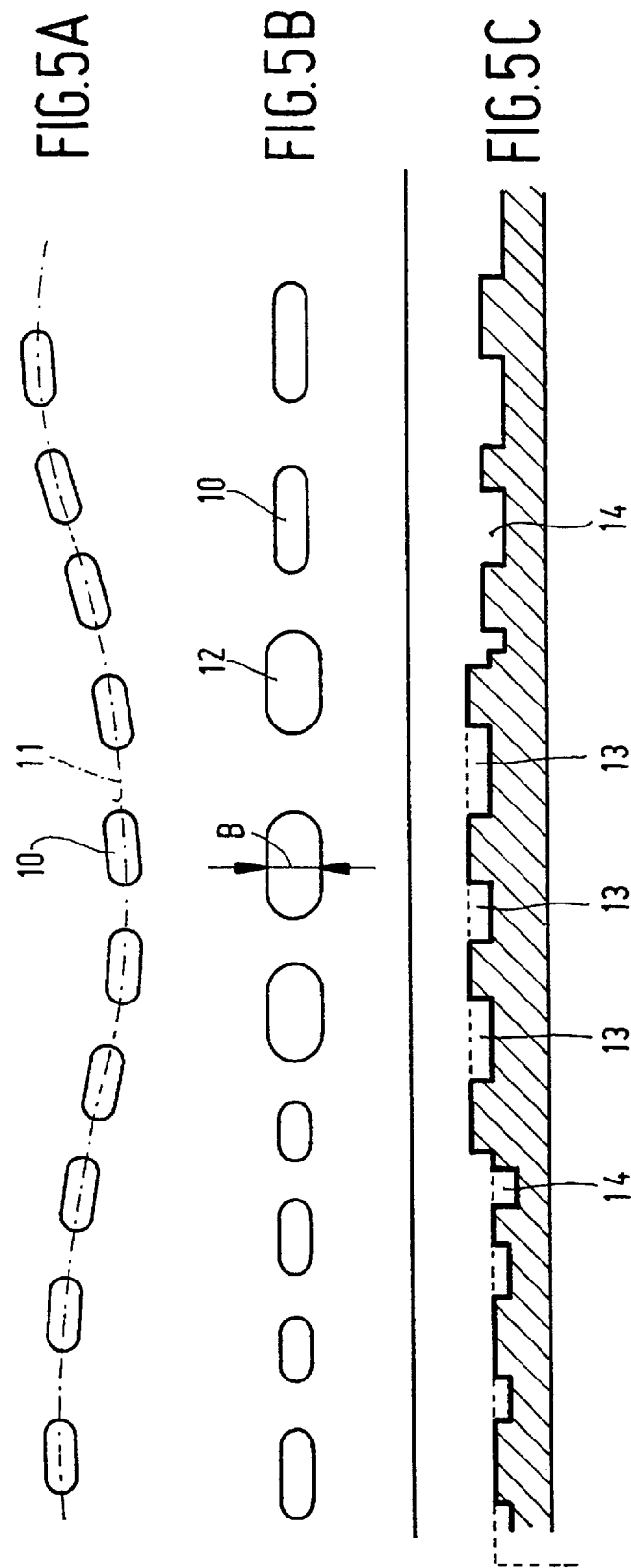

DEVICE AND METHOD FOR PRODUCING AN OPTICAL REGISTRATION CARRIER BY MEANS OF A MASTER MOLD, AN OPTICAL REGISTRATION CARRIER

A method for producing an optical registration carrier by means of a master, mold a device suitable for carrying out such a method, an optical registration carrier, a method for verifying such an optical registration carrier.

The invention relates to a method for producing, by means of a master mold, an optical registration carrier which is provided with at least one program which comprises information stored in the form of variations in a physical parameter and verification marks which are stored at random verification positions, wherein the master mold is made by means of an encoder and a laser beam recorder, wherein the laser beam recorder is driven from the encoder for storing at least said program and said verification marks on the master mold.

The invention furthermore relates to a device which is suitable for carrying out such a method.

The invention furthermore relates to an optical registration carrier provided with at least one program which comprises information stored in the form of variations in a physical parameter.

The invention furthermore relates to a method for verifying such an optical registration carrier.

The encoder and the laser beam recorder may be integrated in one apparatus, or they may be separate devices, which cooperate with each other. The encoder generates information by means of which the intensity of the laser and of the laser beam is modulated for storing the program on the master mold.

From U.S. Pat. No. 5,572,589 a method is known to directly manipulate a master mold used to produce CD-ROMs so that the CD-ROMs are produced therewith have a desired pattern of damage. After producing these CD-ROM's by means of such a master mold, an identifying value, based upon which tracks have been damaged and based upon an encoding scheme that has been adopted is marked on the CD-ROM using an inkjet or other suitable marking mechanisms. By doing so optical discs are serialized so as to be able to distinguish among optical discs holding the same data. To seralize each disc is relatively time consuming.

When producing optical registration carriers, such as CD's, CD-ROM's, DVD's and the like in a conventional manner, music and user information, among other things, are stored in a so-called active program of the registration carrier. General information with regard to the music and information such as coordinates of the beginning and the end of a particular part, among other things, is stored in a so-called passive program.

The passive program inter alia comprises the lead-in and lead-out sectors on the registration carrier, whilst the active program is that part of a registration carrier on which the user data is stored. With some registration carriers there is no such distinction between passive and active programs, they only comprise an active program.

When making the master mold by means of which the eventual registration carriers are produced, the user data and additional information is supplied to an encoder. The encoder generates the information as it is to be stored on the registration carrier, that is, the passive program (the lead-in and lead-out sectors) and the active program. In the encoder, error-correcting techniques (for example CIRC) are carried out, and the information is processed with an 8 to 14 modulation (EFM), for example. CIRC and EFM are techniques which are used for CD registrations, for DVD registration carriers this is a Reed Solomon Product code and 8 to 16 modulation, for example. The EFM signal is then transmitted to a laser beam recorder, by means of which a photosensitive film present on a glass disc is exposed. The glass disc is subsequently subjected to a chemical treatment and the glass master mold is obtained. The master mold may then be used for producing molds. The master mold or the molds made by means of said master mold are used for producing the plastic registration carriers, CD's etc., by means of an injection molding technique.

As is described inter alia in CA-2,165,532, the eventual registration carriers such as CD's, CD-ROM's etc., are frequently copied illegally. In order to verify whether a registration carrier has been sold legally, use is made of an SID code, among other things. The SID code is stored on the master mold by means of the laser beam recorder, and subsequently transferred to the registration carrier via the metal mold. The SID code is a visible code which contains information on the laser beam recorder or the encoder that has been used.

The SID code has a number of drawbacks.

If the SID code is not correctly stored in the laser beam recorder, it will be easy to leave out the SID code when using the laser beam recorder, or to substitute the code illegally by a code from a third party.

In this manner it is relatively easy to produce illegal registration carriers which are indistinguishable from legally produced registration carriers.

It is an object of the invention to provide a method for producing optical registration carriers by means of a master mold, wherein the registration carrier is provided with a hallmark which is practically impossible to copy, thus making it possible to distinguish clearly between legally and illegally produced registration carriers.

This objective is accomplished with the method according to the invention in that coordinates of the verification positions are encrypted into verification information, which is stored in the program on the master mold by means of said laser beam recorder.

In this manner it is relatively easy to store the verification marks as well as the verification information on the master mold, which verification marks will subsequently form a hallmark for an authentic, original registration carrier.

Since the verification information is encrypted or encoded, it is possible to store secret information at secret places on the registration carrier. The term encrypting is thereby understood to mean the processing of the verification information by means of encryption techniques, so that it will not be immediately apparent what information the verification information comprises. It is possible thereby to use ASCII or binary encoding.

The presence of the verification marks, which are stored at encrypted or encoded verification positions, makes it relatively easy to distinguish between legals registration carriers and illegal registration carriers.

When the registration carrier is being copied illegally, the information stored on the registration carrier can be copied bit by bit. The bit sequence contains errors, however, which are corrected by error correction methods when the registration carrier is being played in a normal manner by the equipment which is required for that purpose. If the complete bit sequence is copied, said errors will also be copied, of course, the new errors, will be introduced as a result of said copying, as a result of which the total number of errors will result in a decreased quality of the illegal registration carrier.

Another method is to play the information which is stored on a registration carrier by means of suitable equipment, and make use of the error correction methods. The digital information obtained in this manner can subsequently function as a base for producing good illegal registration carriers.

The provision of predetermined verification marks at encoded verification positions provides various possibilities of verifying whether a registration carrier has been produced legally. The verification mark stored at a verification position may for example be an error in the bit sequence which has been intentionally introduced, which error is corrected by the error correction methods when a registration carrier is being played. When copying takes place bit by bit, the error in question will not be removed and relatively poor illegal registration carriers will be obtained.

When the information is copied and error correction methods are used, the intentionally introduced errors will be removed, as a result of which the illegal registration carrier can be recognized by the absence of the verification marks which are expected at the verification positions.

In addition to that it is possible to store other intentionally introduced errors at the verification positions, such as a deviation as regards the track position, track width, track depth, etc. Said errors are not copied, either, when copying bit by bit. As a result of this, it has become practically impossible to copy illegally in a way that it is not possible to know from the illegal registration carrier whether it is an illegal version or an original one.

It is noted that from Dutch patent application No. 8703032 a method is known for storing on an information carrier characteristic data, such as the exact location of a physical modification on the information carrier. Said patent application does not relate to optical registration carriers, however. Furthermore, it is not possible to derive from said patent application the manner in which an optical registration carrier can be produced and be provided with a finger print, as it were, which is unique for that specific optical registration carrier.

Furthermore it is noted that from European patent application EP-A1-0 644 474 a method is known for securing an optical registration carrier against illegal copying. According to said patent application a registration carrier is made first, after which errors contained in a registration carrier are utilized for additionally storing a key on said registration carrier. With the method according to the invention, a master mold is made, by means of which registration carriers are produced which are directly provided with the desired program, with the verification information and with the verification marks present at the verification positions.

In preferred embodiments, the encoder and/or laser beam recorder identification code is encrypted as well. As a result of this, it is practically impossible to interfere with the laser beam recorder drive via the software, as a result of which the identification codes will always be present on the registration carrier, and it can be traced immediately when an illegal copy is found by which laser beam recorder and/or encoder the master mold required for the registration carrier has been made.

It is possible to arrange the encoder and the laser beam recorder in such a manner that said apparatuses check one another, as it were, for the presence of a suitable code, and that they will only co-operate with each other after mutual approval.

If the identification code is stored in the program, it is practically impossible to prevent the correct identification code associated with the laser beam recorder and/or the encoder being stored on the master mold.

The invention furthermore relates to a method for verifying the registration carrier, which method is characterized in that said verification information located in the program is decoded by means of a key code, as a result of which the verification positions become known, after which the verification marks present at the verification positions are compared with the expected verification marks.

The key for decoding the verification positions from the verification information and the verification marks to be found at said verification positions must only be available to authorized parties, of course.

The invention will be explained in more detail hereafter with reference to the drawings, wherein:

FIG. 1 is a diagrammatic representation of a device according to the invention;

FIGS. 2A–2D diagrammatically show information stored on registration carriers according to the invention;

FIGS. 3 and 4 diagrammatically show part of the structure of a CD registration carrier and a DVD registration carrier respectively;

FIGS. 5A–C show various alternative possibilities for verification information.

Like parts are numbered alike in the figures.

FIG. 1 diagrammatically shows a laser beam recorder 1 and an encoder 2, which each comprises an associated identification code 3, 4. The encoder furthermore comprises a verification positions generator 5, by means of which random verification positions HC can be generated. The encoder 2 is furthermore provided with means, which are known per se, for driving the laser beam recorder 1. Encoder 2 and laser beam recorder 1 may be separate units or be integrated into one system.

Laser beam recorder 1 comprises a verification information generator 6. Both the laser beam recorder 1 and the encoder 2 comprise an encryption unit 7, 8 at an output.

The operation of the device according to the invention is as follows. When a master mold is to be made, the system controller starts laser beam recorder 1 and encoder 2. Encoder 2 and laser beam recorder 1 are coupled, and the laser beam recorder identification code LBR ID is transmitted from laser beam recorder 1 to encoder 2 via encryption unit 7 and encryption unit 8. The presence of the double encryption units 7, 8 makes it practically impossible to find out the laser beam recorder identification code LBR ID. From the encoder, the encoder identification code (encoder ID) is transmitted to the laser beam recorder in a reverse manner via encryption units 8, 7. Both in laser beam recorder 1 and in encoder 2 it is verified whether the apparatus coupled therewith has identified itself correctly. Then coordinates of a number of random verification positions are generated by means of encoder 2, and it is indicated from laser beam recorder 1 which verification marks are to be stored at said verification positions. Subsequently, the encoder identification code, laser beam recorder identification code, coordinates of the verification positions and verification marks to be stored at verification positions are encrypted by encoder 2, after which the encoder transmits the bit signal to laser beam recorder 1. Following that, a laser beam is emitted from laser beam recorder 1. Following that, a laser beam is emitted from laser beam recorder 1, by means of which the photosensitive layer present on the master mold to be made is exposed. It is practically impossible for the system controller to interfere in this process.

FIGS. 2A–2B globally show the information stored on a CD and a DVD, wherein the portion indicated AP is the active program and the portions to the left and to the right thereof constitute the passive program. In the case of a CD registration carrier, said portions are called the lead-in (LI) and the lead-out (LO) program respectively. According to the invention, the verification information comprising the identification codes of the laser beam recorder and the encoder as well as the coordinates of the verification positions is preferably stores in the passive program at ID1 and ID2. Subsequently, the expected verification marks are stored at said verification positions in the active program.

Figure 1:
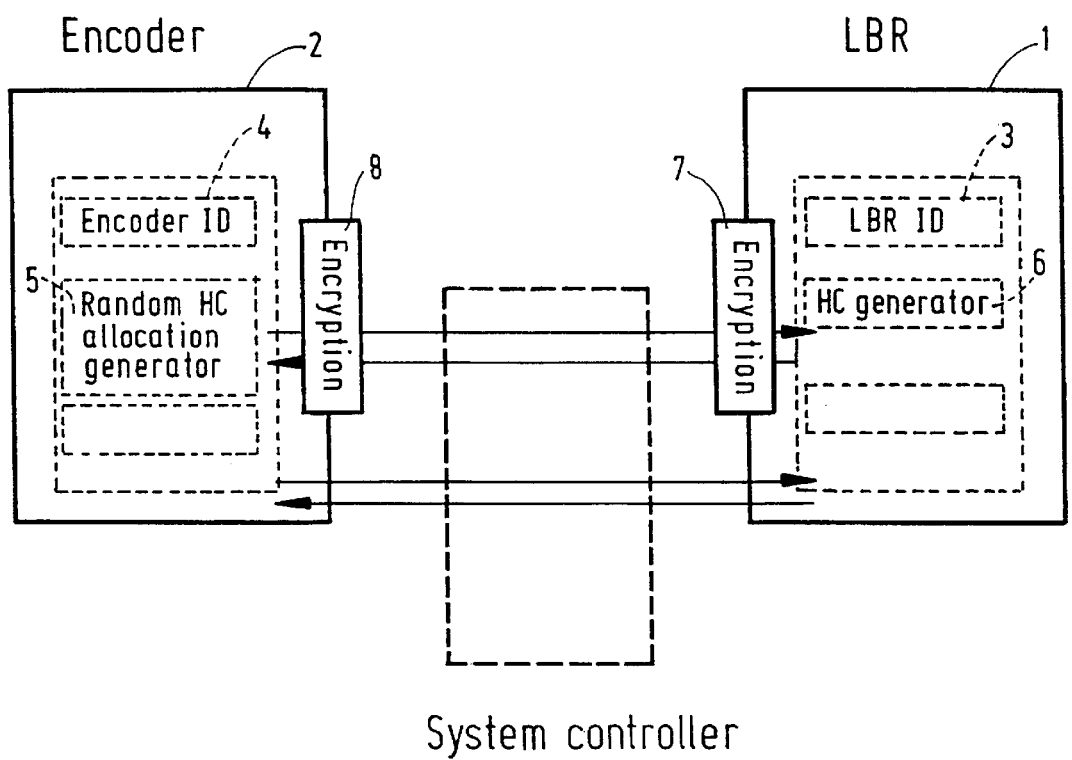
Figure 2A:
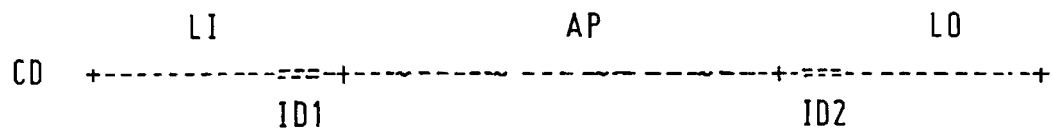
FIG. 2C shows a registration carrier wherein both the verification information and the verification marks are stored in the active program.
FIG. 2D shows a registration carrier which is only provided with an active program, wherein the verification information as well as the verification marks are stored in the active program.
Figure 2B:
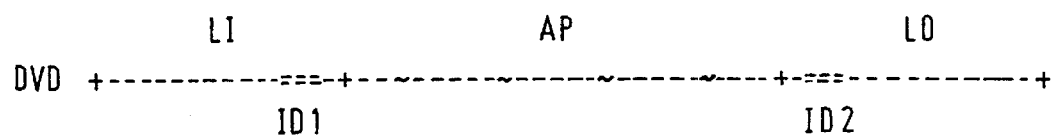
Figure 2C:
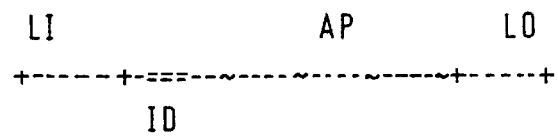
Figure 2D:
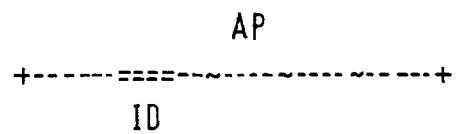

In FIGS. 2A–2D, "–" indicates the normal information, "+" indicates the boundaries between active and passive programs, "=" indicates the verification information, and "~" indicates the verification positions and the verification marks stored thereat.

The verification mark is for example a recessed (pit) or an elevated (land) portion of a clearly deviating length, for example 20 clock pulses. Normally, only lengths of for example maximally 11 clock pulses are permitted. When a registration carrier which is provided with information having a length of 20 clock pulses is being played, correction takes place by means of error correction methods. The EFM signal from the registration carrier can be analyzed by means of a time interval analyzer (TIA), and the information having a deviating length can be traced relatively easily.

Alternative verification marks are shown in FIGS. 5A–C, wherein FIG. A shows pits 10 positioned one behind the other, not in a circular path, but in a path comprising a predetermined wave.

FIG. 5B shows verification marks wherein the width B of pits 12 is different from that of pits 10.

In FIG. 5C, the verification pits 13 are positioned higher than the surrounding pits 14.

Of course it is possible to store various already known verification marks at the various verification positions, whereby unauthorized persons do not know which verification marks are present at which verification positions. Since the list of verification positions is furthermore encoded, it is practically impossible for an unauthorized person to produce an illegal registration carrier which contains all verification marks.

Figure 4:
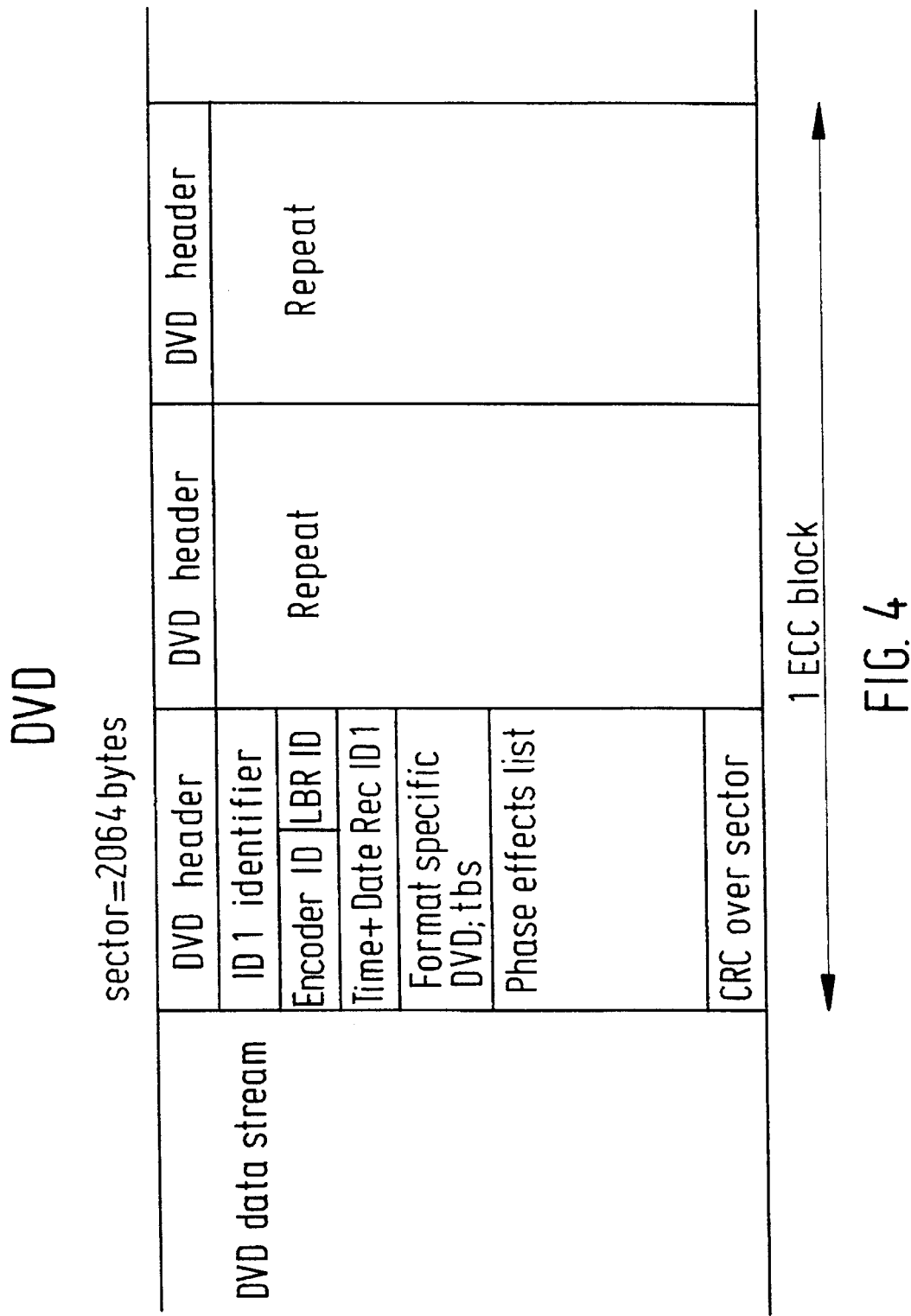

FIGS. 3 and 4 show a part of the passive program of a CD registration carrier and a DVD registration carrier respectively, whereby the encoder identification code (encoder ID), the laser beam recorder identification code (LBR ID), the time and the data of recording (time+date rec ID1) and the encoded verification positions (phase marks list) are stored in the passive program. Preferably, said verification information is present on the registration carrier a number of times in order to prevent loss of information, for example in the case of the damage to the registration carrier.

In addition to that, it is possible to store the verification information in that part of the passive program which is not read by means of normal playback equipment.

In the case of playback equipment of a CD registration carrier, a reading spot is moved to a position in the lead-in portion, after which a so-called Table of Contents is read. Once the information of the Table of Contents is complete, the reading spot is moved to the start of the active program. The verification information is preferably written at the end of the lead-in portion, where the reading spot normally does not come. Thus, it is possible to indicate a position where the reading spot normally does not come for the lead-out portion as well.

Since it is preferred to generate a new sequence of verification positions and associated verification marks for each new master mold, and since it is possible to vary the verification marks stored at the verification positions as well, if desired, it has become impossible to illegally copy registration carriers which will be hallmarked as legal. The copying of registration carrier is not made impossible by the methods and the devices according to the invention, therefore, but they make it possible to identify whether a registration carrier has been produced legally or illegally. Since it is preferred to store the code relating to the laser beam recorder and/or the encoder used for making the master mold simultaneously with the production of the registration carrier, it is easy to trace whose equipment has been used for making the master mold when an illegal registration carrier is detected. This will discourage the owner of the laser beam recorder and the encoder to a large degree from giving his assistance in illegal practices.

It is also possible for the coordinates of the verification positions to be generated in the laser beam recorder and/or in the system controller, or in both the encoder and the laser beam recorder or the system controller.

In addition to storing information on the devices that have been used, it is also possible to store other relevant information, such as the point in time at which the registration carrier was produced or the geographic position of the laser beam recorder by means of Global Positioning techniques or information which is specific for the title.

The method may also be used in a CD or DVD recorder or in another device for writing on optical media in a simple manner.

Not every CD-R registration carrier comprises a so-called lead-in or lead-out portion (passive program), so that in the case of a CD-R registration carrier the verification information must be stored in a portion of the active program which will not be consulted when the CD-R is being played.

What is claimed is:

1. A method for producing, through use of a master mold, an optical registration carrier which is provided with at least one program having information stored in the form of variations in a physical parameter, the program also having verification marks which are stored at verification positions, wherein the master mold is made through use of an encoder and a laser beam recorder, wherein the laser beam recorder is driven from the encoder for storing at least said program and said verification marks on the master mold, the method comprising:

randomly generating the verification positions; and encrypting coordinates of the verification positions to provide verification information, wherein the verification information is stored in the program on the master mold by the laser beam recorder.

2. A method according to claim 1, wherein an encoder identification code is encrypted by the encoder, after which the encrypted identification code is stored in the program on said master mold as verification information by said laser beam recorder.

3. A method according to claim 1, wherein a laser beam recorder identification code is stored in the program on said master mold as verification information by said laser beam recorder.

4. A method according to claim 1, wherein verification marks are stored at the randomly verification positions in a program between a lead-in and lead-out program, and verification information is stored in at least one of the lead-in and lead-out program.

5. A method according to claim 3, wherein the identification code of the laser beam recorder is encrypted in the encoder, together with the encoder identification code, into verification information to be incorporated into the program on said master mold.

6. A device, comprising:
   a laser beam recorder coupled to an encoder;
   a random verification positions generator configured to randomly generate verification positions; and
   a mechanism configured to adapt a program generated by said laser beam recorder, wherein coordinates of the verification positions are stored in verification information in the program, and verification marks are stored at the verification positions in the program.

7. A device according to claim 6, wherein at least one of a laser beam recorder identification code stored in the laser beam recorder and an encoder identification code stored in the encoder can be processed into verification information by said encoder.

8. An optical registration carrier produced by a master mold, the optical registration carrier having at least one program thereon, said program comprising information stored in the form of variations in a physical parameter and predetermined verification marks which are present at randomly generated verification positions, wherein coordinates of the randomly generated verification positions are encrypted to provide verification information that is stored in the at least one program by a laser beam recorder.

9. An optical registration carrier according to claim 8, wherein said verification information of said program further comprises an identification code relating to a device used to produce the registration carrier.

10. An optical registration carrier according to claim 8, wherein said verification is stored in a lead-in and/or lead-out program, and said verification marks are stored in a program between the lead-in and lead-out program.

11. An optical registration carrier according to claim 10, wherein said verification information is stored in a hidden part of at least one of the lead-in and lead-out program.

12. An optically writeable registration carrier having at least one program thereon which comprises information stored in the form of variations in a physical parameter and predetermined verification marks which are present at randomly generated verification positions produced by a laser beam recorder, wherein said program, further comprises verification information which includes encrypted coordinates of said randomly generated verification positions on the registration carrier.

13. The optical registration carrier according to claim 8, wherein said verification information located in the program is decoded by means of a key code to reveal the verification positions, after which the verification marks present at the verification positions are compared to expected verification marks.

14. The optical registration carrier according to claim 13, wherein an identification code of a device used to produce the optical registration carrier is revealed as a result of said decoding of the verification information.

15. A method for producing an optical registration carrier having at least one portion containing information stored as variations in a physical parameter, the at least one portion having verification marks that are stored at verification positions in the at least one portion, the method comprising:
   randomly generating the verification positions on the optical registration carrier; and
   encrypting coordinates of the verification positions to provide verification information, wherein the verification information is stored in the at least one portion of the optical registration carrier by a laser beam recorder.

16. The method of claim 15, wherein the optical registration carrier is produced using a master mold made by an encoder and said laser beam recorder, wherein said laser beam recorder is driven from the encoder to store the at least one portion and said verification marks on the master mold.

17. The method of claim 16, further comprising:
   the encoder encrypting encoder identification code to provide encrypted identification code; and
   storing the encrypted identification code in the at least one portion of the master mold as verification information by said laser beam recorder.

18. The method of claim 16, further comprising storing an identification code of the laser beam recorder in the at least one portion on the master mold as verification information.

19. The method of claim 15, wherein the verification marks are stored at the randomly generated verification positions in an active portion between a lead-in and lead-out portion, and verification information is stored in the lead-in and lead-out portion.

20. The method according to claim 18, further comprising encrypting the identification code of the laser beam recorder in the encoder, along with the encoder identification code, to provide verification information that is incorporated into the at least one portion on the master mold.

21. The method of claim 17, further comprising the laser beam recorder verifying the encoder identification code.

22. The method of claim 18, further comprising the encoder verifying the laser beam recorder identification code.

23. A method of claim 1, further comprising verifying an encoder identification code with the laser beam recorder.

24. A method of claim 23, further comprising encrypting the encoder identification code with the encoder before verifying the encoder identification code with the laser beam recorder.

25. The method of claim 1, further comprising verifying a laser beam recorder identification code with the encoder.

26. A method of claim 25, further comprising encrypting the laser beam recorder identification code with the laser beam recorder before verifying the laser beam recorder identification code with the encoder.

27. The method of claim 1, wherein the verification marks are at least one of recessed pits or elevated portions.

* * * * *